US010875639B2

(12) United States Patent
Crocco

(10) Patent No.: US 10,875,639 B2
(45) Date of Patent: Dec. 29, 2020

(54) BI-PLANER ROTOR BLADE

(71) Applicant: United States of America as represented by the Secretary of the Army, Washington, DC (US)

(72) Inventor: John P. Crocco, Newport News, VA (US)

(73) Assignee: United States of America as represented by the Secretary of the Army, Washington, DC (US)

( * ) Notice: Subject to any disclaimer, the term of this patent is extended or adjusted under 35 U.S.C. 154(b) by 94 days.

(21) Appl. No.: 16/279,595

(22) Filed: Feb. 19, 2019

(65) Prior Publication Data

US 2020/0262551 A1    Aug. 20, 2020

(51) Int. Cl.
*B64C 27/473*  (2006.01)
*B64C 27/467*  (2006.01)
*B64C 27/46*   (2006.01)

(52) U.S. Cl.
CPC .......... *B64C 27/473* (2013.01); *B64C 27/463* (2013.01); *B64C 27/467* (2013.01)

(58) Field of Classification Search
CPC ... B64C 27/473; B64C 27/463; B64C 27/467; B64C 27/10; B64C 11/18; B64C 11/48; B64C 11/20; B64C 39/068; F04D 29/666; F04D 29/327
USPC .................................................... 416/227 R
See application file for complete search history.

(56) References Cited

U.S. PATENT DOCUMENTS

| 680,671 | A | * | 8/1901 | Brewster | A47J 43/0711 416/227 R |
|---|---|---|---|---|---|
| 1,820,529 | A | * | 8/1931 | Darrieus | F03D 1/0608 416/196 R |
| 2,273,756 | A | * | 2/1942 | Hoenrkamp | F04D 29/325 416/227 R |
| 2,552,651 | A | * | 5/1951 | Skold | F04D 29/382 416/204 R |
| 4,668,169 | A | | 5/1987 | Perry | |
| 5,111,576 | A | * | 5/1992 | Kuhnle | F42B 10/58 29/889.23 |
| 5,246,344 | A | | 9/1993 | Perry | |
| 5,890,875 | A | * | 4/1999 | Silvano | A63H 33/40 228/144 |
| 6,142,738 | A | * | 11/2000 | Toulmay | B64C 27/463 416/223 R |
| 6,293,492 | B1 | | 9/2001 | Yanagisawa | |
| 7,018,167 | B2 | * | 3/2006 | Yoshida | F03D 1/0608 415/4.5 |
| 8,042,763 | B2 | | 10/2011 | Arlton et al. | |
| 8,167,233 | B2 | | 5/2012 | Brody et al. | |
| 9,702,254 | B2 | | 7/2017 | Saiz | |

(Continued)

*Primary Examiner* — Nathaniel E Wiehe
*Assistant Examiner* — Ryan C Clark
(74) *Attorney, Agent, or Firm* — Michael K. Gray

(57) ABSTRACT

A biplaner rotor blade has an upper airfoil section connected to a lower airfoil section such that the upper airfoil and lower airfoil are rotated in separate planes—an upper plane and a lower plane. The upper airfoil has a root end attached to a hub at an upper location of the hub and the lower airfoil has a root end attached to the hub at a lower location of the hub. The upper airfoil converges with the lower airfoil to form a blade tip end at the outermost portion of the blade, thus generating lift along two geometric planes.

11 Claims, 8 Drawing Sheets

(56) References Cited

U.S. PATENT DOCUMENTS

2013/0136613 A1\* 5/2013 Silvano .................... F03D 1/06
    416/227 R
2017/0174323 A1\* 6/2017 Roberts ................ B64C 27/463

\* cited by examiner

BI-PLANER ROTOR BLADE

DEDICATORY CLAUSE

The invention described herein may be manufactured, used and licensed by or for the Government for governmental purposes without the payment of any royalties.

BACKGROUND

1. Field of the Invention

The present invention pertains to rotor blades. More particularly, the invention pertains a helicopter rotor blade having upper and lower airfoils which air integrally connected, with the upper airfoil rotating in a first plane and the lower airfoil rotating in a second plane.

2. Discussion of the Background

A rotorcraft is an aircraft that has rotating wings (rotor blades) that create lift and thrust allowing the aircraft to take off and land vertically. A conventional rotorcraft has a single main rotor, and a tail rotor to provide a counteracting movement to the torque generated by the main rotor. The single main rotor can be made up of a single, or multiple rotor blades. Typically a main rotor has two or more blades. A conventional rotor blade has an airfoil that extends from the center of the rotor hub outward from the root of the blade to the end.

On a conventional blade, the airfoil may change in shape, twist and sweep along the length of the blade. Conventional rotor blades have challenges in achieving adequate stiffness requirements, and limiting blade flapping/deflection. Requirements to carry heavy loads into confined spaces also becomes a challenge as rotor diameter becomes the limiting factor. Adding of additional blades in order to achieve higher lifting capacity also becomes challenging, as integration of multiple blades onto a rotor hub results in interference between blades and control actuators. Requirements to achieve high speeds also limit blade design in order to deal with Mach effects and compressibility of air, as well as retreating blade stall.

Also, since rotor blades are complex due to the interactions of structural, inertial, and aerodynamic forces acting on the wings when rotating, a few problems occur with existing rotor blades. For instance, the size of rotor blade diameters creates a landing limitation restriction in austere environments with limited minimal landing space available such as at a streets intersection.

SUMMARY OF THE INVENTION

A biplaner rotor blade, used for purposes of propelling a rotorcraft through a fluid, has an upper portion (upper airfoil) having a straight upper-portion leading edge which extends from an open side of the biplaner rotor blade for a first predetermined distance. The upper-portion straight leading edge is rotatable in a first planar region. The upper portion leading edge forms a chord line with an upper-portion trailing edge such that the chord line forms an upper sweep angle $\theta$ with the first planar region. The upper portion has an upper-portion connection region which begins at an upper-portion-trailing edge demarcation point and an upper-portion-leading edge demarcation point and extends to a tip region.

A lower portion (lower airfoil) has a straight lower-portion leading edge which extends from the open side of the biplaner rotor blade for a second predetermined distance. The lower-portion straight leading edge is rotatable in a second planar region, with the first planar region and the second planar region being in parallel. The lower-portion leading edge forms a chord line with a lower-portion trailing edge such that the chord line forms a lower sweep angle $-\Omega$ with the second planar region. The lower portion has a lower-portion connection region which begins at a lower-portion-trailing edge demarcation point and lower-portion-leading edge demarcation point and extends to the tip region so as to connect the upper portion and the lower portion. The upper portion has a root end which is connect to a hub of a rotorcraft and the lower portion has a root end which connects to a hub of a rotorcraft, the upper portion and lower portion can be connected to the same or different hubs. The upper portion and lower portion can be connected with a stabilizing rod and the biplaner rotor blade can be a one-piece integral structure or a multiple-piece connected structure.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DETAILED DESCRIPTION

Figure 1:
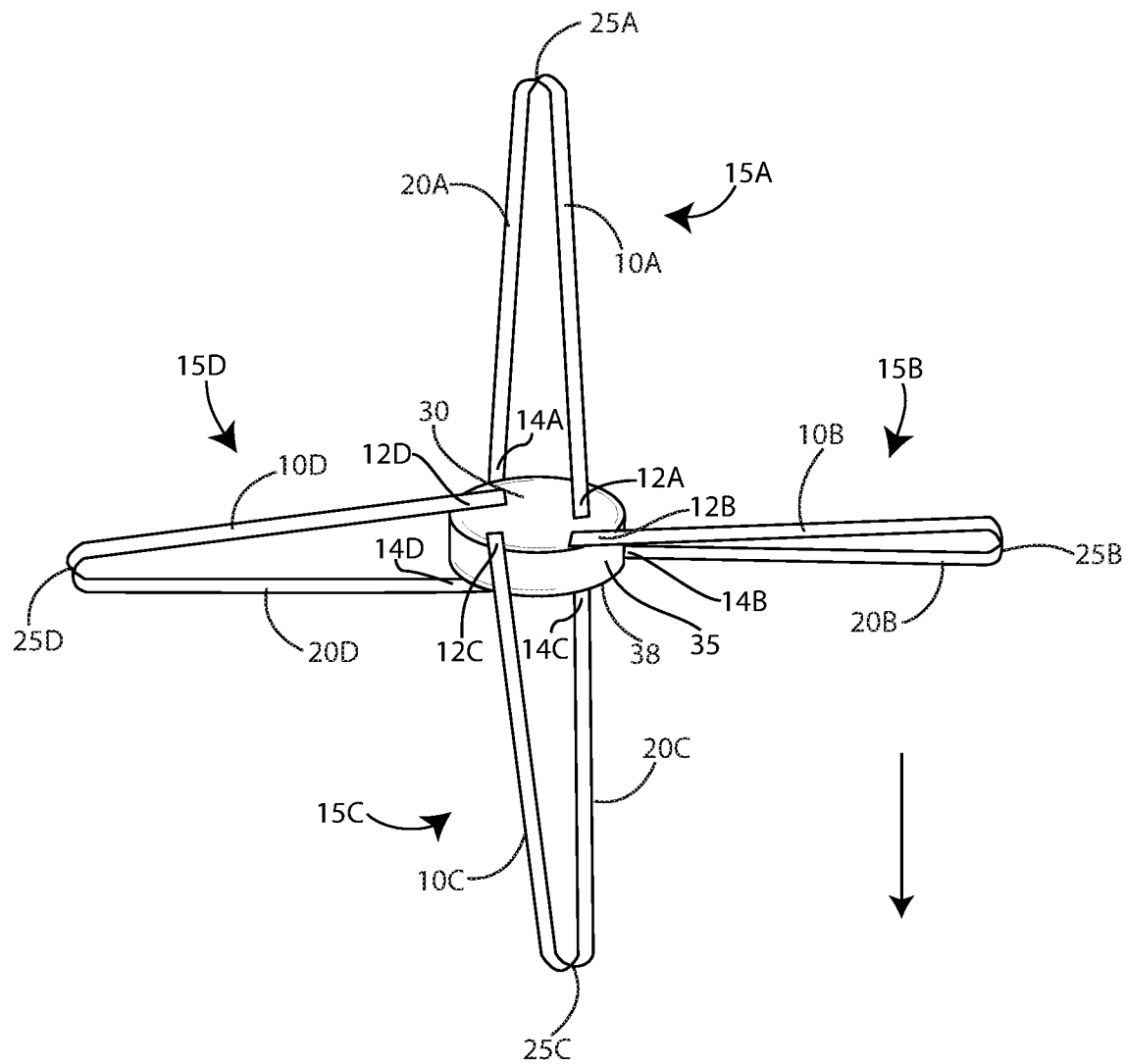
FIG. 1 is a top-perspective view of the bi-planer rotor blades in accordance with the present invention mounted on a hub.

With reference to FIG. 1, biplaner rotor blades 15A, 15B, 15C and 15D, in accordance with the present invention, are arranged around and mounted to a hub 35. Rotor blade 15A has an upper portion (upper airfoil) 10A and a lower portion (lower airfoil) 20A. Upper portion 10A has a root end 12A which connects to the upper portion 30 of hub 35. Lower portion 20A has a root end 14A which connects to the lower portion 38 of hub 35.

Upper portion 10A and lower portion 20A connect to each other at tip region 25A. Four biplanar blades are depicted in FIG. 1; however, any number of such blades can be utilized as appropriate for a given rotorcraft.

Rotor blade 15B has an upper portion (upper airfoil) 10B and a lower portion (lower airfoil) 20B. Upper portion 10B has a root end 12B which connects to the upper portion 30 of hub 35. Lower portion 20B has a root end 14B which connects to the lower portion 38 of hub 35. Upper portion 10B and lower portion 20B connect to each other at tip region 25B.

Rotor blade 15C has an upper portion (upper airfoil) 10C and a lower portion (lower airfoil) 20C. Upper portion 10C has a root end 12C which connects to the upper portion 30 of hub 35. Lower portion 20C has a root end 14C which connects to the lower portion 38 of hub 35.

Rotor blade 15D has an upper portion (upper airfoil) 10D and a lower portion (lower airfoil) 20D. Upper portion 10D has a root end 12D which connects to the upper portion 30 of hub 35. Lower portion 20D has a root end 14D which connects to the lower portion 38 of hub 35.

Figure 2:
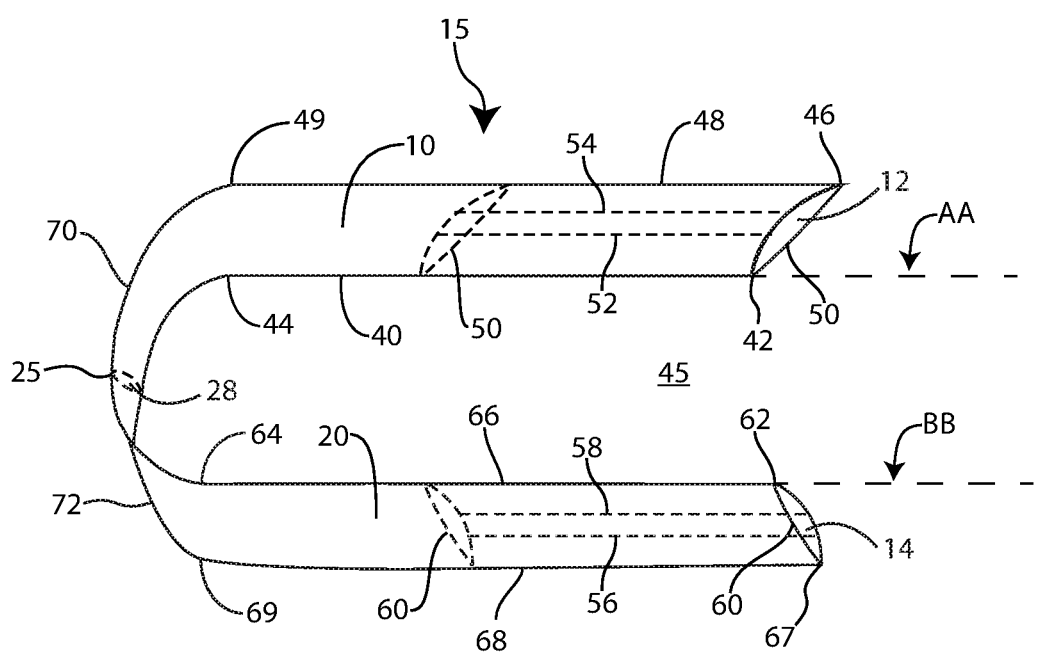
FIG. 2 is a perspective, partial x-ray view of the biplaner rotor blade of the present invention.

With reference to FIG. 2, a biplaner rotor blade 15 in accordance with the present invention and those of FIG. 1, has an upper portion (upper airfoil) 10 and a lower portion (lower airfoil) 20. The upper portion 10 has an upper-portion leading edge 40 which extends from an open side 45 of said biplaner rotor blade 15 for a first predetermined distance, with the predetermined distance being measured by the distance from leading edge end point 42 to leading edge demarcation point 44.

The upper-portion leading edge is rotatable in a first planar region AA. Upper portion leading edge 40 forms a chord line 50 with an upper-portion trailing edge 48 such that the chord line forms an upper sweep angle $\Omega$ with the first planar region AA. Chord line 50 is the distance from leading edge 40 to trailing edge 48.

Upper portion 10 has an upper-portion connection region 70 which begins at an upper-portion-trailing edge demarcation point 49 and the upper-portion-leading edge demarcation point 44 and extends to a tip region 25. In FIG. 2 upper connection region 70 and lower portion connection region 72 are curved connect at tip region 25.

A lower portion 20 of biplaner rotor blade 15 (FIG. 2) has a lower-portion leading edge 66 which extends from the open side 45 of the biplaner rotor blade 15 for a second predetermined distance, with the second predetermined distance being measured from leading edge end point 62 to leading edge demarcation point 64. The lower-portion leading edge 81 being rotatable in a second planar region BB. The lower-portion leading edge 66 forms a chord line 60 with a lower-portion trailing edge 68 such that the chord line forms a lower sweep angle $-\Omega$ with the second planar region BB. The chord line 60 is the distance between trailing edge 68 and leading edge 66.

The lower portion 20 has a lower-portion connection region 72 which begins at lower-portion-trailing edge demarcation point 69 and lower-portion-leading edge demarcation point 64 and extends to tip region 25. The tip region is connected to the upper-portion connection region 70 and to the lower-portion connection region 72. The upper portion 10 has a camber as indicated by camber lines 52, 54 and lower portion 20 has a camber as indicated by camber lines 56, 58. Upper portion 10 has a root end 12 and lower portion 20 has a root end 14.

Figure 3:
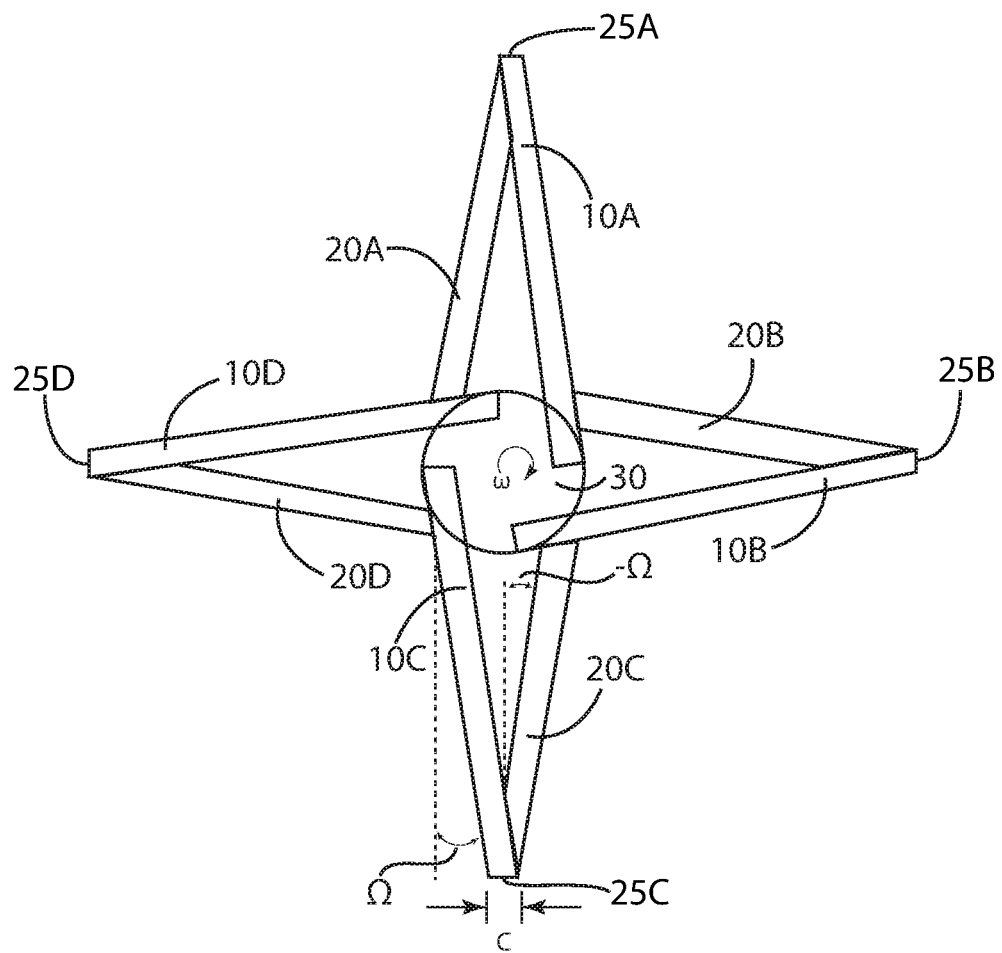
FIG. 3 is a top view of the of biplaner rotor blades of the present invention mounted on a hub.

In the top view of FIG. 3, the upper portions 10A, 10B, 10C, 10D of the respective blades 15A, 15B, 15C, 15D are attached at their respective roots 12A, 12B, 12C, 12D to the upper part 30 of the hub 35. The lower portions 20A, 20B, 20C, 20D attach at their respective roots 14A, 14B, 14C, 14D to the lower portion 38 of the hub 35 which has a diameter of "d". With reference to FIG. 3, the upper portion of the blade is advancing into the air flow prior to the lower portion of the blade. This can be reversed by either changing W (direction of rotation) or reversing the blade.

The respective upper portions 10 and lower portions 20 are airfoils providing lift or thrust. The outermost portions, i.e., upper-portion connecting region 70 and lower-portion connecting region 72 converge and attach at the outermost end at tip region 25. The length of the upper portion 10 of each blade is depicted as length "L" (FIG. 4), with the vertical separation between each blade's respective upper portion and lower portion and 20) being a distance "d". (Length L does not necessarily have to be the same for the upper and lower portons).

By having two airfoils attached at the hub (root end) as well as at the tip end, and by separating the airfoils on different geometric planes (upper plane and lower plane) augmented lift and overall blade stiffness can be realized. The rotor hub rotates clockwise about (w), with the upper portion 10 of each blade being swept backward by an angle of $(-\Omega)$ and each the lower portion being swept forward by an angle of $(+\Omega)$.

Figure 4:
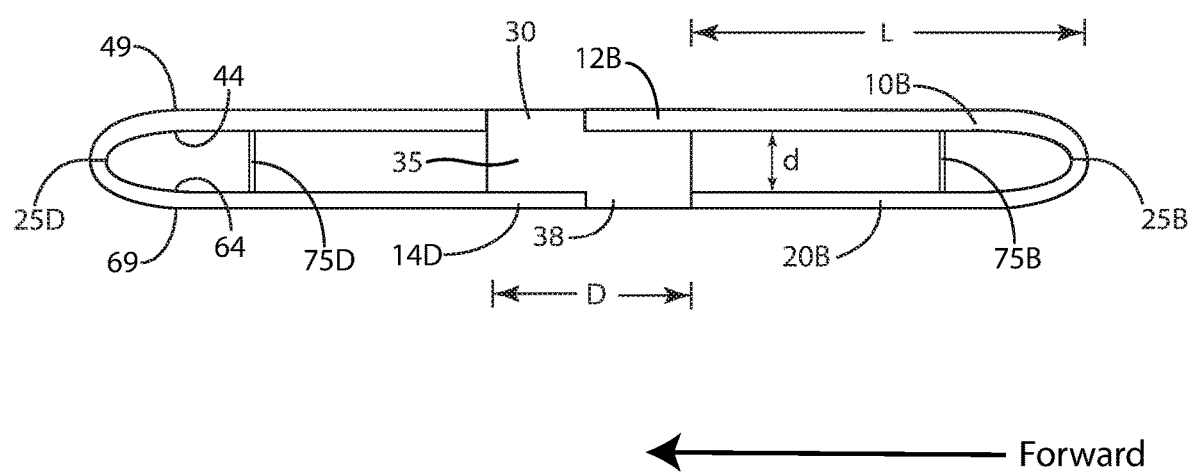
FIG. 4 is a side view of two biplaner rotor blades of the present invention arranged on a hub.

In FIG. 4, which is a side view with two of the biplanar rotor blades (from FIGS. 1 and 3) removed for better illustration. Vertical attachment or stabilizer rod 75B connects upper portion 10B with lower portion 20B and stabilizer rod 75D connect upper portion 10B with lower portion 20B along the length of L to increase stiffness, if needed.

For a constant sweep blade, Omega ($\Omega$) can be a function of the effective diameter D of the hub, and the length L of the blade.

Figure 5:
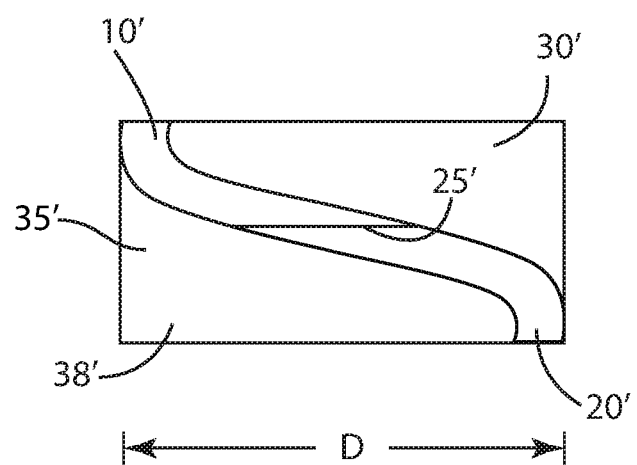
FIG. 5 is a side partial elevational view demonstrating an alternative embodiment for attaching the respective roots of the upper airfoil and lower airfoil to a hub.
Figure 6:
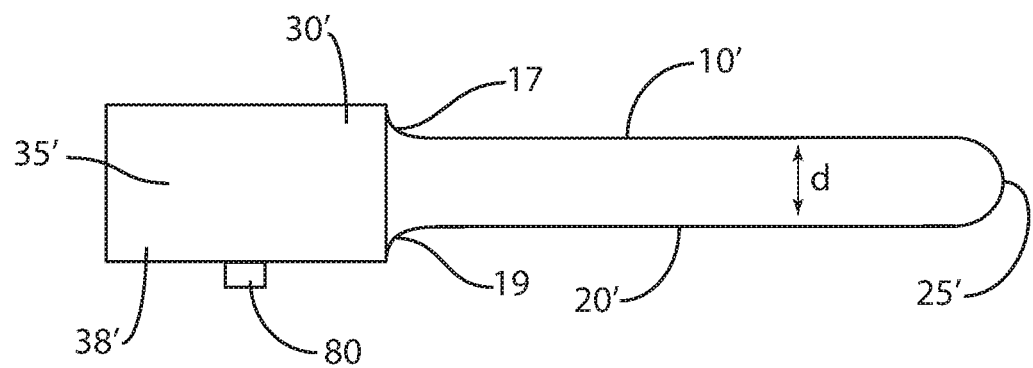
FIG. 6 is a side view further demonstrating the alternative embodiment of FIG. 5.

With reference to FIG. 5 and FIG. 6, in an alternate embodiment, the root end 12' of the upper portion 10' and the root end 14' of the lower portion 20' are tapered in their connection to hub 35' resulting in a shorter distance between the upper 10' and lower 20' portions (when mounted on the same hub) than the embodiment shown in FIGS. 1 and 3.

Figure 7:
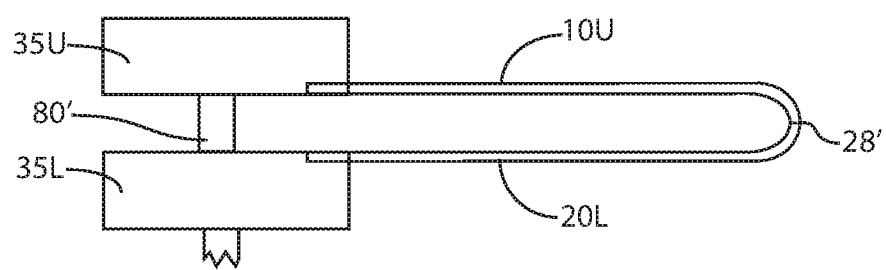
FIG. 7 is a side view depicting yet another arrangement or embodiment for mounting the biplane rotor blade of the present invention where the upper air foil is mounting to an upper hub and the lower air foil is mounted to a lower hub.

In FIG. 7, two hubs 35U and 35L are used to mount upper and lower portions of the biplaner blade which are arranged on shaft 80'. Upper portion 10L of a biplaner rotor blade is attached to upper hub 35U and the lower portion 20L is attached to lower hub 35L.

Each blade in the drawing figures has a constant cross section of "c" (FIG. 3) and rotates clockwise about the hub in the direction of 'w'. (Different cross-sections could be devised and are possible).

The angle of sweep of the upper portion of the blade has a magnitude of $\Omega$. Thus, the angle created by the sweep of the upper portion of the blade and the lower portion of the blade is $2\times\Omega$ (2 times $\Omega$).

The distance between the upper portion 10 and lower portion 20 of the blade is a distance "d". Attachment of each blade to the hub can be accomplished in many different ways, with methods previously developed under prior art being used to accomplish this. The blades and hub can be monolithic. Each blade can be rigidly attached to a central hub via bolts or other mechanical means. Each blade can have hinges, bearings, or actuators at each attachment point to react blade motions (flapping, twisting, or in-plane) provide appropriate blade frequency tuning, and react centrifugal force loads. Hub attachments can be accomplished by seperate hubs or yokes reacting centrifugal force (CF) and flapping loads, the hub can be monolithic.

The specific attachment mechanism will depend on specific application. Actuation can be accomplished using methods previously developed under prior art, but the invention allows for multiple actuation points to impart control to each individual blade or blade portion. For example, actuation to change the blade angle of attack can be accomplished at the attachment point for on the upper and lower portions 10, 20 or at both locations for each blade.

Pitch control can be accomplish by using one attachment point as a rotation hinge (e.g. at 10), and the other attachment point as an actuation point (e.g. at 20). This may allow for reduced pitch actuation loads as the rotation hinge can provides mechanical advantage. Collective and cyclic control can be achieved through a single swashplate at the lower portion of the hub 35 or through two swashplates and differential vertical motion between the top and bottom of hub 35.

In a configuration with rigidly attached blades, thrust control can be achieved by changing the rotational speed (W). The blades are attached to and rotating about a center hub with the hub having a diameter of length d.

The amount of sweep ($\Omega$) and the rotational speed of the hub (W) are a function of the overall aircraft requirements for speed, payload and size.
For example:

$$\pm\Omega = f(d, L, \text{forward speed requirement})$$

$$W = f(\Omega, \text{compressibility effects})$$

In the present invention, the outermost portions of both the upper and lower portions of the blade converge and are attached at the outermost end. By having two airfoils attached at the hub (root end) as well as at the tip end, and by separating the airfoils on different geometric planes (upper plane and lower plane) improvements in lift and overall blade stiffness can be achieved.

There may also be vertical attachments from the upper airfoil to the lower airfoil, along the length of L to increase stiffness, if needed. In the example provided in FIG. 3, the rotor hub 30 rotates clockwise about (w), the upper blade 10C is swept backward by an angle of +$\Omega$, the lower blade 20C is swept forward by an angle of −$\Omega$.

For a constant sweep blade, Omega ($\Omega$) can be function of the effective diameter of the hub given as D, and the length of the blade L, which is the length of the blade from the hub. In this example, the upper portion of the blade is advancing into the air flow prior to the lower portion of the blade. This can be reversed by either changing W (direction of rotation) or reversing the blade.

Effective sweep angle of the blades for a given aircraft can be optimized to ensure limited deleterious effects of compressibility or retreating blade stall. The separation distance "d" between the upper and lower portion of the blade can be optimized to minimize airflow disturbance or drag, as well as optimize geometric stiffness requirements of the blade. In the figures shown, the effective chord length c is constant, but it can be tailored along the length L of the blade as well.

Figure 8:
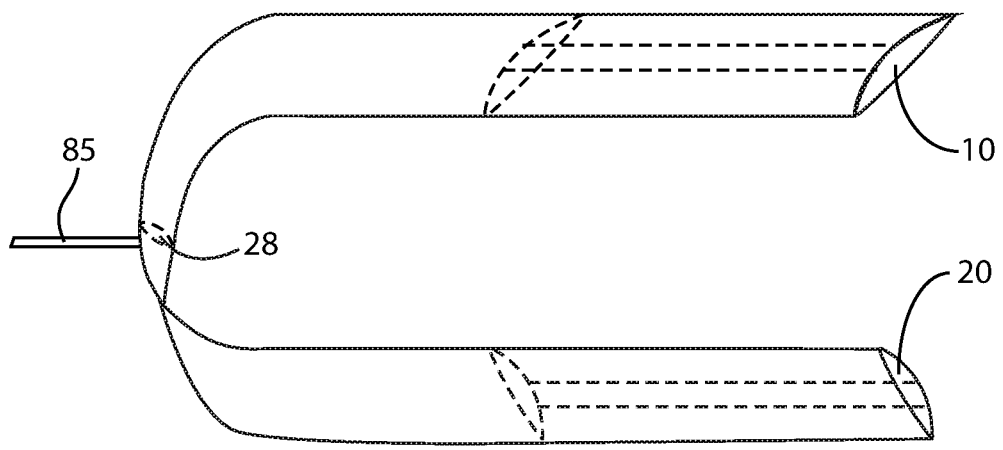
FIG. 8 is a perspective view of the biplaner rotor blade of the present invention in an embodiment which includes an airfoil extension member.

As an alternative with reference to FIG. 8, the tip region of the blade can converge into an airfoil extension 85 and continue outward, thus providing more lift, with extension 85 extending from the tip 28 connecting the upper and lower portions 10, 20.

In the present invention, the attachment point of the upper portion of a blade 10 to the upper section of the hub 30 does not interfere with other attachment points of the other blades, and does not interfere with the attachment of the lower portion of the blade 20 to the lower portion of the hub; therefore, the design provides a robust ability to attach the blade to the upper and lower hub, as the upper blade attachment point does not interfere with the lower blade attachment point, or any other blade attachment. This also provides multiple options to affect rotor blade control.

For example, actuation could occur at the upper portion of the blade or the lower portion, or both. The relative distance between the upper hub and lower hub could be adjusted via actuation of the hub to impart elastic deformation into each blade and effect the control.

Another approach may have each blade rigidly attached to the hub. In this approach, thrust could be controlled by changing rotational speed (W). On a multi rotor aircraft, variable thrust from each rotor is used to control the aircraft. The inherent stiffness of the blade, and the amount of sweep ($\Omega$) provide benefits in the range of rotations speed, and thereby the range of thrust that can be achieved before blade stall occurs.

Various modifications of the invention may be made to the invention without departing from the scope and spirit of the foregoing disclosure. Accordingly, the invention's scope is limited only by the claims appended hereto.

What is claimed is:

1. A biplaner rotor blade, comprising:
an upper portion having an upper-portion straight leading edge which extends for a first straight distance from an upper-leading-edge end point to an upper-portion-leading-edge demarcation point, said upper-portion straight leading edge being rotatable in a first planar region, said upper-portion straight leading edge forming an upper chord line with an upper-portion trailing edge such that the upper chord line forms an upper sweep angle $\Omega$ with the first planar region, said upper portion having an upper-portion connection region which begins at an upper-portion-trailing edge demarcation point and the upper-portion-leading-edge demarcation point and extends to a tip region;
a lower portion having a lower-portion straight leading edge which extends for a second straight distance from a lower-leading-edge end point to a lower-portion-leading-edge demarcation point, said lower-portion straight leading edge being rotatable in a second planar region that is parallel to said first planar region, said lower-portion straight leading edge forming a lower chord line with a lower-portion trailing edge such that the lower chord line forms a lower sweep angle −$\Omega$ with the second planar region, said lower portion having a lower-portion connection region which begins at a lower-portion-trailing edge demarcation point and the lower-portion-leading edge demarcation point and extends to said tip region; and wherein:
said tip region is connected to said upper-portion connection region and said lower-portion connection region, with said upper portion being a first air foil and said lower portion being a second air foil such that said upper portion and said lower portion provide a total sweep angle of 2$\Omega$.

2. A biplaner rotor blade according to claim 1, wherein:
said first straight distance and said second straight distance are equal.

3. A biplaner rotor blade according to claim 1, wherein:
a fluid surrounds the biplanar rotor blade and fills an area from an open side to said tip region.

4. A biplaner rotor blade according to claim 3, wherein:
the fluid is air.

5. A biplaner rotor blade according to claim 1, wherein:
said upper portion has an upper-root end which is connectable to a hub of a rotorcraft.

6. A biplaner rotor blade according to claim 5, wherein:
said lower portion has a lower-root end which is connectable to the hub of the rotorcraft.

7. A biplaner rotor blade according to claim 1, wherein:
a stabilizing rod is connected to said upper portion and said lower portion.

8. A biplaner rotor blade according to claim 1, wherein:
said upper portion and said lower portion are integrally connected.

9. A biplaner rotor blade according to claim 1, wherein:
said tip region is a connection region connecting said upper portion and said lower portion.

10. A biplaner rotor blade according to claim 9, further comprising:
an airfoil extension connected to said connecting region and extending laterally outward therefrom.

11. A biplaner rotor blade according to claim 1, wherein:
said upper portion connection region and said lower portion connection region are curved.

* * * * *